(12) United States Patent
Lal

(10) Patent No.: US 7,091,843 B1
(45) Date of Patent: Aug. 15, 2006

(54) FUNCTIONAL AND ORNAMENTAL VEHICLE ACCESSORIES

(76) Inventor: Rajiv Singh Lal, 1101 Kingswood Dr., Akron, OH (US) 44313

( * ) Notice: Subject to any disclaimer, the term of this patent is extended or adjusted under 35 U.S.C. 154(b) by 27 days.

(21) Appl. No.: 10/288,119

(22) Filed: Nov. 5, 2002

(51) Int. Cl.
  B60Q 1/22 (2006.01)
  B60Q 1/26 (2006.01)
  B60Q 1/34 (2006.01)
  B60Q 1/50 (2006.01)
  B60Q 1/52 (2006.01)
  A47G 35/00 (2006.01)
  A44C 23/00 (2006.01)
  F21V 7/04 (2006.01)

(52) U.S. Cl. .................. 340/468; 340/463; 340/464; 340/471; 340/474; 340/475; 362/565; 362/566; 362/605; 362/611

(58) Field of Classification Search ........ 340/463–479, 340/457; 362/80, 494, 565, 566, 605, 611; 248/305, 294.1
See application file for complete search history.

(56) References Cited

U.S. PATENT DOCUMENTS

| | | | |
|---|---|---|---|
| 831,510 A | 9/1906 | Heimann | |
| 2,403,093 A | 7/1946 | Lear | |
| 2,473,141 A | 6/1949 | Friedberg | |
| D155,093 S | 9/1949 | Leonard | |
| 2,630,530 A | 3/1953 | Mack et al. | |
| D174,602 S | 4/1955 | Tunki | |
| D180,158 S | 4/1957 | Raftis et al. | |
| 3,727,044 A * | 4/1973 | Monroy | 362/554 |
| 3,833,908 A | 9/1974 | Loh | |
| D233,155 S | 10/1974 | Wada | |
| 3,902,177 A | 8/1975 | Mori et al. | |
| 4,080,603 A | 3/1978 | Moody | |
| D250,874 S | 1/1979 | D'Haem | |
| D270,054 S | 8/1983 | Spycher | |
| 4,511,954 A * | 4/1985 | Marcus et al. | 362/492 |
| 4,631,516 A * | 12/1986 | Clinker | 340/464 |
| D297,841 S | 9/1988 | Shimazaki | |
| 4,825,217 A | 4/1989 | Choi | |
| 4,933,665 A * | 6/1990 | Bull et al. | 340/457 |
| D309,736 S | 8/1990 | Charet et al. | |
| 4,975,809 A * | 12/1990 | Ku | 362/605 |
| 5,016,996 A * | 5/1991 | Ueno | 359/838 |
| 5,032,846 A | 7/1991 | Chang | |
| D320,396 S | 10/1991 | Shimazaki | |
| D320,601 S | 10/1991 | Harada | |
| D320,794 S | 10/1991 | Konishi | |
| 5,072,837 A | 12/1991 | Rosch | |
| 5,103,205 A * | 4/1992 | Halligan | 340/473 |
| 5,155,494 A | 10/1992 | Bryant et al. | |
| 5,260,686 A * | 11/1993 | Kuo | 340/479 |
| 5,311,412 A * | 5/1994 | Yang | 362/541 |

(Continued)

OTHER PUBLICATIONS

International Search Report, PCT/US03/00633, mailed Oct. 29, 2004.

(Continued)

*Primary Examiner*—Daniel Wu
*Assistant Examiner*—Lam Pham
(74) *Attorney, Agent, or Firm*—Amin & Turocy, LLP

(57) ABSTRACT

Systems and methods for a functional and ornamental vehicle accessory are provided. The vehicle accessory includes a housing and a mounting mechanism for coupling the accessory to a vehicle. The vehicle accessory can also include a light source or light conducting member. Wiring for electrically connecting the light source can be included such that the vehicle accessory can illuminate during a variety of vehicle functions. The vehicle accessory can also operate as a communication hub for the vehicle.

15 Claims, 8 Drawing Sheets

U.S. PATENT DOCUMENTS

| | | | |
|---|---|---|---|
| 5,389,942 A | 2/1995 | Oglesby, Jr. | |
| 5,451,974 A | 9/1995 | Marino | |
| D363,071 S | 10/1995 | Leu | |
| 5,481,244 A * | 1/1996 | Dicke | 340/473 |
| 5,596,234 A | 1/1997 | Umeda et al. | |
| 5,652,565 A * | 7/1997 | Salcedas et al. | 340/479 |
| 5,666,103 A * | 9/1997 | Davis, Jr. | 340/479 |
| RE35,635 E | 10/1997 | Bauman | |
| D388,101 S | 12/1997 | Harada | |
| 5,764,141 A * | 6/1998 | Chang | 340/472 |
| 5,889,496 A | 3/1999 | Maas | |
| 5,894,292 A | 4/1999 | Everest et al. | |
| 5,905,434 A * | 5/1999 | Steffan et al. | 340/464 |
| 5,913,616 A * | 6/1999 | Galella | 40/542 |
| 5,939,979 A * | 8/1999 | Lee | 340/479 |
| D414,495 S | 9/1999 | Helligenstein et al. | |
| 5,966,073 A * | 10/1999 | Walton | 340/479 |
| 5,977,928 A | 11/1999 | Ying et al. | |
| 6,050,121 A | 4/2000 | Daehn et al. | |
| D428,407 S | 7/2000 | Vano | |
| 6,104,355 A | 8/2000 | Wilson | |
| 6,149,287 A * | 11/2000 | Pastrick et al. | 362/494 |
| 6,188,317 B1 * | 2/2001 | Wang | 340/465 |
| D440,964 S | 4/2001 | Vano | |
| 6,218,996 B1 | 4/2001 | Shuen | |
| 6,326,888 B1 * | 12/2001 | Wang | 340/463 |
| 6,329,950 B1 | 12/2001 | Harrell et al. | |
| 6,346,925 B1 | 2/2002 | Matsumoto | |
| 6,377,222 B1 * | 4/2002 | Nicholson | 343/713 |
| 6,404,334 B1 * | 6/2002 | Chao | 340/472 |
| 6,421,016 B1 | 7/2002 | Phillips et al. | |
| 6,425,490 B1 | 7/2002 | Ta | |
| 6,457,690 B1 * | 10/2002 | Spykerman et al. | 248/305 |
| D466,110 S | 11/2002 | Vano | |
| 6,483,479 B1 | 11/2002 | Lin et al. | |
| 6,517,227 B1 * | 2/2003 | Stidham et al. | 362/494 |
| 6,559,811 B1 | 5/2003 | Pulimi et al. | |
| 6,600,451 B1 | 7/2003 | Mimura et al. | |
| 6,608,597 B1 | 8/2003 | Hadzoglou et al. | |
| D480,714 S | 10/2003 | Wang | |
| 6,642,842 B1 * | 11/2003 | Khamis | 340/467 |
| 6,657,558 B1 | 12/2003 | Horita et al. | |
| 6,677,856 B1 * | 1/2004 | Perlman et al. | 340/468 |
| 6,837,607 B1 * | 1/2005 | Wagner | 362/565 |
| 2002/0190016 A1 | 12/2002 | Ta | |

OTHER PUBLICATIONS

Monofilar helical antenna, Fig. 3 found at http://web.archive.org/web/20010923131631/http://www.virtualscience.co.uk/celia/Celia_code/geometry_editor.htm using the Internet Archive Wayback Machine. Sep. 23, 2001, internet search conducted on Nov. 19, 2005.

Helical antenna found at http://web.archive.org/web/200110222173027/http://www.iis.ee.ethz.ch/research/bioemc/em_simulation_platform.en.html using the Internet Archive Wayback Machine. dated Feb. 22, 2001, internet search conducted on Nov. 19, 2005.

Helical antenna found at http://homepage3.nifty.com/satimage.html using the Internet Archive Wayback Machine, dated Oct. 29, 2004, internet search conducted on Nov. 19, 2005.

* cited by examiner

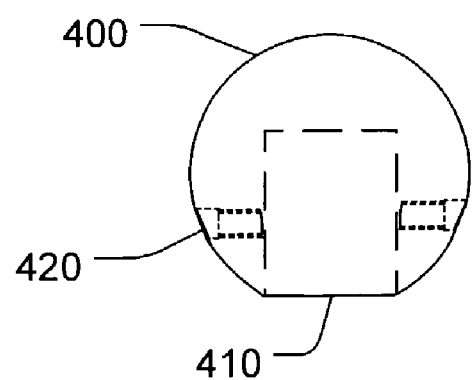 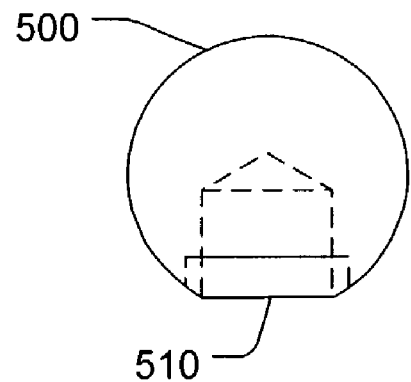
FIG. 4    FIG. 5
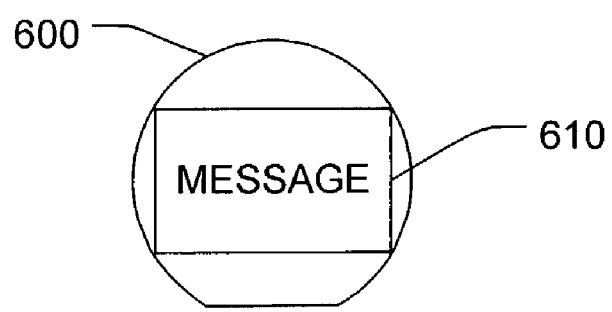
FIG. 6

FUNCTIONAL AND ORNAMENTAL VEHICLE ACCESSORIES

TECHNICAL FIELD

The present invention generally relates to vehicles. In particular, the present invention relates to vehicle accessories and methods for making, and coupling accessories to a vehicle.

BACKGROUND OF THE INVENTION

Auxiliary warning lights have been incorporated on sides of motor vehicles to provide a means of communicating the intentions of an operator thereof to adjacent vehicles, such as, the intention to change traffic lanes or make a turn. Such lights are advantageous in providing notice to an adjacent vehicle that may be located in a blind spot and positioned such that the signaling vehicle's tail lights are not visible to the adjacent vehicle's operator. While incorporation of such auxiliary warning lights is relatively straightforward on work-type vehicles it becomes a more complex problem when passenger-type vehicles are involved due in part to the importance of aesthetic appearance. Other considerations which can apply to any type of vehicle include the need to position the lights so as to minimize any impact on the vision of the vehicle operator.

In addition to providing transportation, motor vehicles have become a visible symbol of what type of person someone is. For instance, some wealthy people perceive expensive automobiles as a status symbol, while a rugged individualist will often drive a sport-utility type vehicle. Other people like to express themselves by painting their vehicles bold colors, or by decorating their vehicles with a variety of custom, personalized items. As a result of the high number of people who customize their vehicles, a large market has been created which caters exclusively to after-market vehicle products.

SUMMARY

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A system and method are provided for an ornamental and functional vehicle accessory. The accessory includes a housing which is configured to be removably coupled to a vehicle via a mounting end. The housing can be substantially ring-shaped, or the housing can be of any other suitable shape, such as square, crescent, spiral, and straight. The vehicle accessory also includes a mounting assembly for removably coupling the accessory to a vehicle. The mounting assembly includes a mounting pin and a collar. Alternatively, the vehicle accessory can be permanently mounted. An end ornament can also be included on the accessory.

The housing of the vehicle accessory can include a light conducting member extending substantially through the housing. The light conducting member is operative to illuminate at least a portion of the housing. The light conducting member can include a light source, which can be a variety of colors. The light source can be a light emitting diode (LED), a fiber optic bundle, or the housing itself can be optical waveguide. The vehicle accessory can illuminate via manual controls, such as an on/off switch located on the accessory and/or in the vehicle. Alternatively or additionally, the vehicle accessory can include electrical wiring which extends from the light conducting member to the vehicle, such that the light conducting member illuminates with a corresponding vehicle light and/or function. For example, the vehicle accessory can illuminate with a turn signal light, a brake light, a hazard light, a parking light, and/or a security system.

The present invention also relates to a system and method of wireless communication via a vehicle accessory. The vehicle accessory includes a communications interface and is adapted for wireless communication with another vehicle and/or vehicle accessory and/or a portable electronic device. The vehicle accessory is adapted for wireless communication utilizing at least one of a variety of signaling systems, such as satellite, digital, cellular, internet, radio, etc. For example, the wireless communication can be accomplished utilizing one of a plurality of public domain wireless communication standards or a frequency adjusting wireless communication protocol (e.g., to achieve improved noise immunity, such as frequency hopping spread spectrum and/or direct sequence spread spectrum) to facilitate communication to and/or from the vehicle accessory. A user (e.g., vehicle operator, portable electronic device user) utilizing a wireless communication device can be within close proximity (e.g., 10 meters) of a vehicle accessory and can send information (e.g., a "hi" message) for display on the communications interface of the vehicle accessory.

To the accomplishment of the foregoing and related ends, the invention then, comprises the features hereinafter fully described and particularly pointed out in the claims. The following description and the annexed drawings set forth in detail certain illustrative aspects of the invention. These aspects are indicative, however, of but a few of the various ways in which the principles of the invention may be employed and the present invention is intended to include all such aspects and their equivalents. Other objects, advantages and novel features of the invention will become apparent from the following detailed description of the invention when considered in conjunction with the drawings.

BRIEF DESCRIPTION OF THE DRAWINGS

FIG. 4 illustrates a side view of an example of an end ornament in accordance with an aspect of the present invention.

FIG. 5 illustrates a side view of another example of an end ornament in accordance with an aspect of the present invention.

FIG. 6 illustrates a side view of an end ornament having a communications interface in accordance with an aspect of the present invention.

DETAILED DESCRIPTION OF THE INVENTION

Figure 1:
FIG. 1 illustrates a side view of a vehicle accessory in accordance with an aspect of the present invention.
Figure 1:
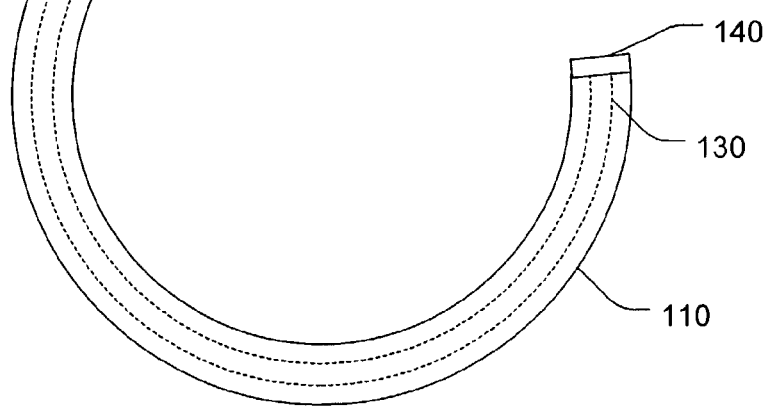

The present invention relates to systems and methods for functional and ornamental vehicle accessories. The present invention will now be described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block form in order to facilitate describing the present invention.

FIG. 1 illustrates an example of a vehicle accessory 100 in accordance with an aspect of the present invention. The vehicle accessory 100 includes a housing 110 which is configured to be removably coupled to a vehicle (not shown) via a mounting end 120. The housing 110 can be substantially ring-shaped, as depicted in FIG. 1. However, it is to be appreciated that the housing 110 can be of any suitable shape, such as square, crescent, spiral, and straight. The housing 110 can also be of any suitable color, such as red, yellow, blue, purple, green, orange, black, white, pink, clear, multi-colored, etc. Thus, the vehicle accessory 100 can be coupled to a vehicle to provide a form of expression for an operator of the vehicle, since the vehicle accessory 100 can be formed and/or decorated with a wide variety of shapes, styles, colors, and/or patterns. The vehicle accessory 100 can also facilitate locating the vehicle amongst a plurality of vehicles.

The housing 110 can optionally include a light conducting member 130, such as a light pipe and a light source, extending substantially through the housing 110. The light conducting member 130 is operative to illuminate at least a portion of the housing 110. Thus, the housing 110 is manufactured from a substantially translucent material, such that the light is visible through the housing 110. The housing 110 can be injection molded from a suitable plastic, such as nylon, acrylonitrile butadiene styrene (ABS) or suitable resinous plastic, or the like. Alternately, other resinous, melt processable plastics or moldable materials such as mineral-filled or glass filled nylon or polyester and polypropylene could be used to form the housing 110. As another alternative, the housing 110 can comprise a fiber reinforced nylon plastic, thermoplastic, or polypropylene or other similar thermoplastic or thermoset materials. Furthermore, the housing 110 can comprise a plurality of designs formed within the housing in order to generate light patterns. For example, stars, stripes, flowers, circles, and various other shapes can be formed in the housing. Natural patterns of the housing material can also generate the light patterns. For example, porous metals can be employed such that the light can illuminate through the pores to create shadows or designs. If a metal housing is employed, the housing can be coated with phosphorous, such that the metal itself can light up. The metal can be copper or any other suitable metal. As yet another alternative, electroluminescent wire can be employed as the housing.

The color of light visible through the housing 110 can be of any color, such as red, yellow, blue, purple, green, orange, black, white, pink, etc. Alternatively, the color of light visible through the housing 110 can be of a plurality of colors. The light can be generated by a boot or cover, a filter, a reflector which surrounds the light source, the light source or the light pipe or a combination of one or more of the aforementioned devices. For example, the light source may produce an amber light from a coating on the light source bulb or from a gas enclosed in the bulb or from the light producing element of the light source. The light can produce a constant light intensity and/or variable light pattern intensity. For example, the vehicle accessory 100 can have a plurality of regions of light patterns. In a first region, the light intensity may have one intensity value, while in a second region; the light intensity may have another light intensity value. Furthermore, each region can have a variable intensity pattern. For example, the portion of the region or nearest to a light source may have a higher light intensity than portions of the region or angled further away from the light source.

The light source can comprise a laser diode, a solid state emitter such as a light emitting diode, an incandescent light source, a fluorescent light source, such as a cold cathode fluorescent light, a phosphorous lamp, a neon light, a discharge lamp, an arc lamp, and an electroluminescent light, including inorganic or organic electro-luminescent sources. Optionally, two or more of such light sources may be incorporated into the vehicle accessory 100 for directing light into respective light input surfaces and light pipes in the housing 110. Furthermore, a plurality of light emitting sources may be grouped to provide a more intense illumination. As described above, a variety of emitting sources may be used as light emitting sources and, including a variety of colors of light emitting diode (LED) sources, such as solid state light emitting diode sources. As another alternative, a fiber optic bundle forming a light pipe may be positioned to discharge light behind the housing. As yet another alternative, the housing 110 itself can be optical waveguide. As yet another alternative, the light source can be a glow-in-the-dark material.

The light source in vehicle accessory 100 can be independently powered, such that a switch and/or remote control can turn the light source on and off. Thus, the vehicle accessory 100 can illuminate regardless of whether the car is on or off. Additionally, or alternatively, the vehicle accessory 100 can include electrical wiring which extends from the light conducting member 130 to a light or function in the vehicle, such that the light conducting member 130 illuminates with the corresponding vehicle light or function. Thus, the vehicle accessory 100 can illuminate with a turn signal light, a brake light, a hazard light, and/or a parking light. The vehicle accessory 100 can also illuminate when a security system is activated or deactivated.

Additionally, or alternatively, the vehicle accessory 100 can include a speaker 140 for sending audible signals to a user or operator of the vehicle; for example, when the security system is activated or deactivated.

Figure 2:
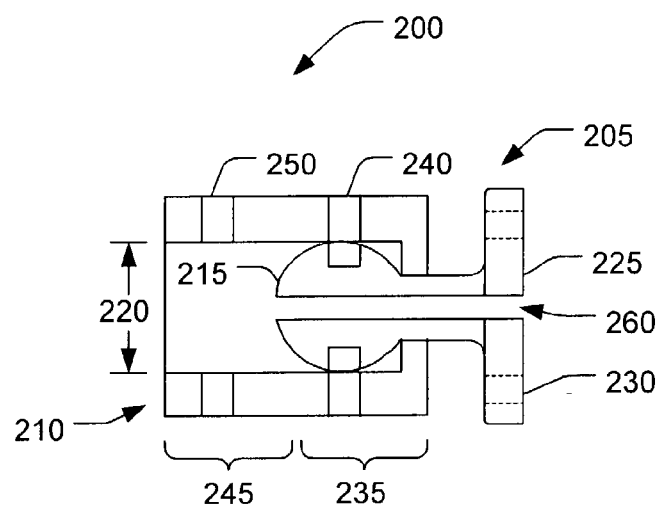
FIG. 2 illustrates a cross-sectional view of a pin and collar mounting assembly in accordance with an aspect of the present invention.

Turning now to FIG. 2, an mounting assembly 200 for removably coupling a vehicle accessory (not shown) to a vehicle (not shown) is depicted. The assembly 200 includes a mounting pin 205 and a collar 210. The mounting pin 205 comprises a spherical portion 215 having an outer diameter which corresponds with an inner diameter 220 of the collar 210. The spherical portion 215 of the mounting pin 205 facilitates positioning the mounting pin 205 at any desired angle or position within the inner diameter 220 of the collar 210. Thus, the vehicle accessory can be mounted to a variety of different locations on the vehicle at a variety of different positions. The mounting pin 205 can be coupled to a vehicle via a base portion 225 of the pin. The base portion 225 of mounting pin 205 includes at least one bore 230 such that a nut and bolt assembly can be employed for coupling the mounting pin 205 to the vehicle. It is to be appreciated that any other suitable method for coupling the mounting pin 205 to the vehicle can also be employed.

Figure 3:
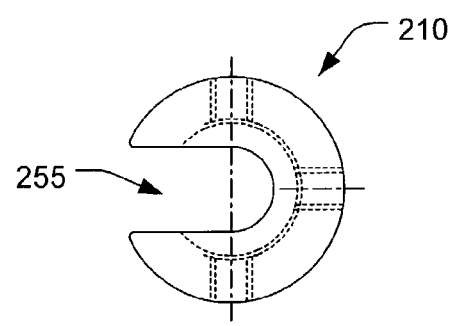
FIG. 3 illustrates a top view of a collar in accordance with an aspect of the present invention.

The collar 210 is configured to couple the vehicle accessory to the mounting pin 205. A first portion 235 of the collar 210 includes at least one threaded bore 240 for coupling to the mounting pin 205; while a second portion 245 of the collar 210 includes at least one threaded bore 250 for coupling to the vehicle accessory. The collar 210 fits over the mounting pin 205 and a mounting end (e.g., 120) of the vehicle accessory via a slot 255 (FIG. 3) in the collar 210. Thus, the collar 210 is coaxially aligned with mounting pin 205 and the mounting end 120. At least two set screws (not shown) are employed in the mounting assembly; one for engaging with mounting pin 205 and the other for engaging with the vehicle accessory. However, the position of the collar 210 and mounting pin 205 can be held by ordinary screws or any other suitable means, such as shackles or pins, which can be used to perform the same function as the set screws. Alternatively, if desired, the coupling between the mounting pin and the collar can be permanent (e.g., utilizing glue or any other suitable adhesive).

The mounting assembly 200 also comprises a bore 260 through a middle portion of the assembly such that electrical wiring (not shown) can extend from a light source located in the accessory to the vehicle. Accordingly, the vehicle accessory can illuminate when lights of the vehicle are turned on (e.g., when brakes are applied to the vehicle, when hazards are turned on, and/or when a turn is signaled) or during different functionalities of the vehicle (e.g., activation of a security system).

Turning now to FIG. 4, an end ornament 400 for coupling to a vehicle accessory (not shown) is illustrated. The end ornament 400 comprises a ball having a recess 410 which corresponds with an outer diameter of the vehicle accessory. Thus, the ball 400 can fit over an end portion of the accessory. Alternatively, the ball 400 can have a recess extending through a diameter of the ball 400 such that the ball 400 can be positioned at a middle portion of the accessory, or at any other desired position on the accessory. The ball 400 also includes at least one threaded bore 420 such that a set screw and/or any other suitable fastener can be employed to securely mount the ball 400 to the accessory.

As an alternative, turning to FIG. 5, an end ornament 500 can comprise a ball which includes a threaded bore 510 for receiving a threaded end portion of a vehicle accessory. Although, the end ornaments 400 and 500 have been described and depicted herein as sphere-shaped ornaments, it is to be appreciated that the end ornament can be of any shape desired, such as square-shaped and star-shaped, for example. Further, the end ornament can have a function associated therewith. For example, the end ornament can be a compass for indicating a direction of a vehicle and/or a thermometer for indicating an outside temperature. Alternatively, the end ornament can include a light source. The light source can operate independent of the vehicle and/or can be electrically wired into the vehicle, such that the end ornament is operative to illuminate when various functions of the vehicle are activated (e.g., turn signals, brake lights, hazards, parking lights, security system). It is to be appreciated that the end ornaments described herein are not necessarily separate components of the vehicle accessories. For example, an end ornament can be formed as part of the housing or can be permanently attached to the accessory.

Moreover, as depicted in FIG. 6, an end ornament 600 can operate as a communication hub for a vehicle. For example, a vehicle accessory having end ornament 600 can wirelessly communicate with another vehicle accessory and/or a vehicle and/or a portable electronic device, such as a cell phone or a personal digital assistant. The end ornament 600 includes a communications interface 610, such as a lead screen. The end ornament 600 and the communications interface 610 are adapted for wireless communication utilizing at least one of a variety of signaling systems, such as satellite, digital, cellular, internet, radio, etc. It is to be appreciated that any portion of the vehicle accessory can be employed as the communication hub. For example, a user utilizing a wireless communications device (e.g., a personal digital assistant, such as a Palm Pilot, adapted for wireless communication, and a mobile messaging device, such as a BLACKBERRY™ device) can come in close proximity (e.g., within 10 meters) of the vehicle accessory and transmit and receive information to and from the vehicle accessory. Utilizing the wireless communications device, the user send a message, greeting, expression, identification, information, communication, inscription, design, artwork, digital image, or the like to the accessory that can be displayed on the communications interface 610. The user can also send signals which can cause the accessory to blink or illuminate. It is to be appreciated that the vehicle accessory itself can operate as the communication hub for the vehicle.

Wireless communication can occur via a frequency adjusting wireless communication protocol, which is a protocol for wireless communication between at least two entities employing frequency adjustment, for example, to achieve improved noise immunity. The protocol can include communication via a portion of the radio frequency and a format for transmissions between the entities. An example of a wireless communication protocol is the Bluetooth open global standard for short-range wireless communication. Bluetooth is a Radio Frequency (RF) specification for short-range, point to multi-point voice and data transfers. Bluetooth can transmit through solid, non-metal objects. It has a nominal link range from 10 centimeters to 10 meters, but can be extended to 100 meters by increasing the transmit power. It is based on short-range radio links and facilitates ad hoc connections for stationary and mobile communication environments. The Bluetooth standard is a low cost, short-range wireless communication standard that typically operates in the 2,400–2,483.5 MHz industrial, scientific and medical (ISM) band. The ISM band is available worldwide and allows unlicensed operation of spread spectrum systems. The Bluetooth standard is often employed for short distance connections and can also provide a bridge to existing data networks. Another example of a frequency hopping spread spectrum wireless communications protocol is ConnexRF by AeroComm. It is to be appreciated that alternative frequency adjusting wireless communication protocols (e.g., to achieve improved noise immunity) are also encompassed within the present invention (e.g., direct sequence spread spectrum). Moreover, as discussed above, wireless communications can also occur via satellite, digital, cellular, internet, radio, etc.

Figure 7:
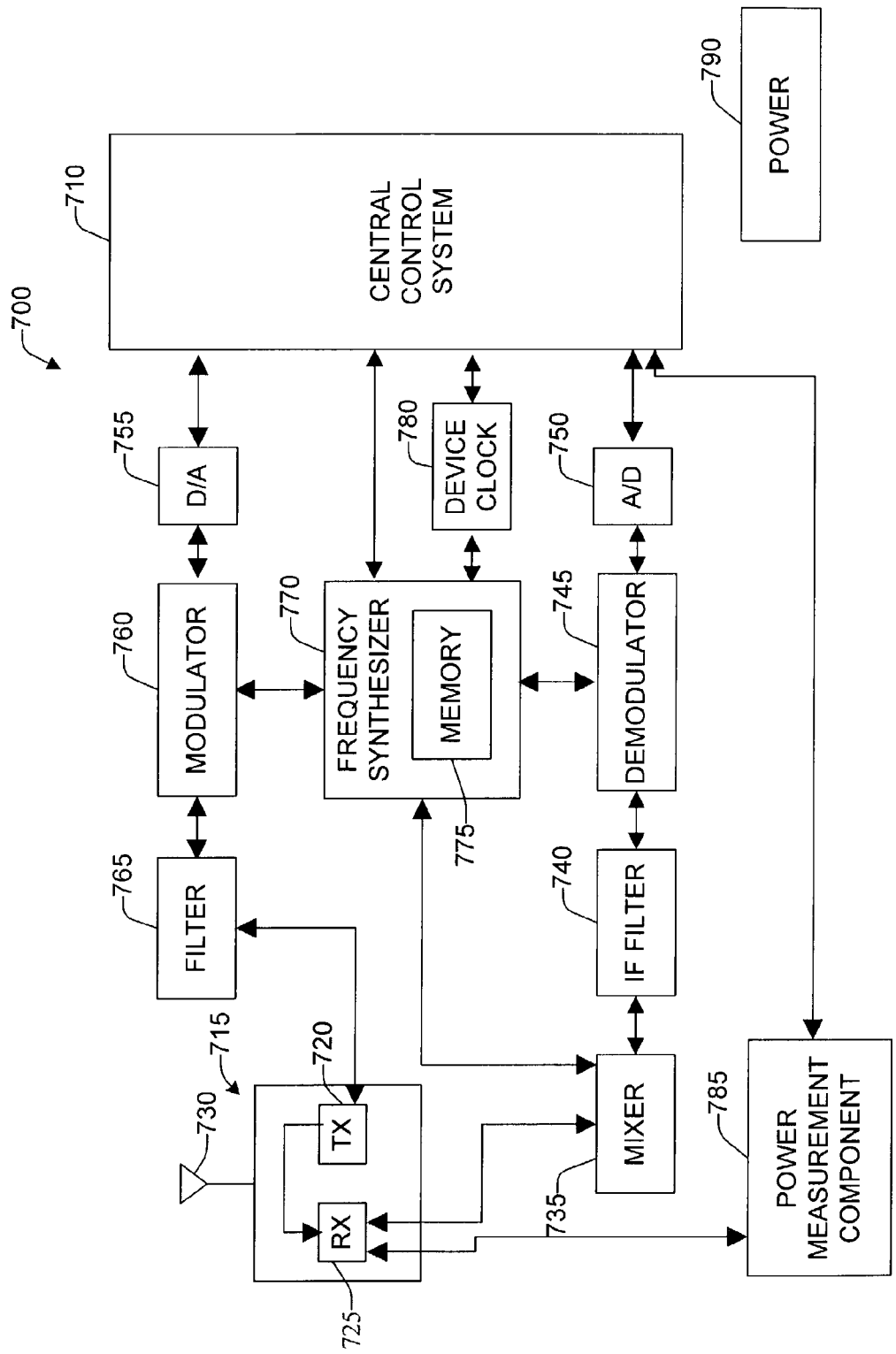
FIG. 7 illustrates a block schematic diagram of a wireless communications device in accordance with the present invention.

FIG. 7 provides a schematic representation of a wireless communications device 700 according to one particular aspect of the present invention. A central control system 710 is responsible for controlling general operations of the wireless communications device 700. The central control system 710 can include a processor or the like that is programmed to control and operate various components within the wireless communications device 700 in order to carry out various functions described herein. The manner in which the processor can be programmed to carry out the functions relating to the present invention will be readily apparent to those having ordinary skill in the art based on the description provided herein.

The wireless communications device 700 includes a transceiver 715 having transmitting circuitry 720 and receiving circuitry 725 that are both coupled to an antenna 730. The receiver 725 receives transmissions through the antenna 730, which is transmitted through a mixer 735, filtered by an intermediate frequency (IF) filter 740 and demodulated by a demodulator 745. The transmission is then digitized through an A/D converter 750 for processing by the central control system 710. Transmissions are transmitted from the central control system 710 through a D/A converter 755 to a modulator 760 and a filter 765 to the transmitter 720 out through the antenna 730. A frequency synthesizer component 770 contains a memory component 775. The frequency synthesizer component 770 cooperates with the central control system 710 and a device clock 780 to provide frequency hopping for the wireless communications device 700. The memory component 775 may include a plurality of register banks for storing synthesizer codes that are employed to facilitate frequency hopping. Alternatively, the register banks may reside in the central control system 710 (e.g., in a memory component, onboard registers or memory in a processor or in separate register components). The frequency synthesizer component 770 is also operatively coupled to the modulator 760, the demodulator 745 and the mixer 735 to provide a frequency oscillation component for transmitting and receiving communications. A measurement power component 785 is operatively coupled to the receiver 725 and provides transmission power measurement information to the central control system 710. Power is provided to the central control system 710 and other components forming the wireless communications device 700 by a power component 790, such as a battery power module, line power or the like, for example.

Figure 8:
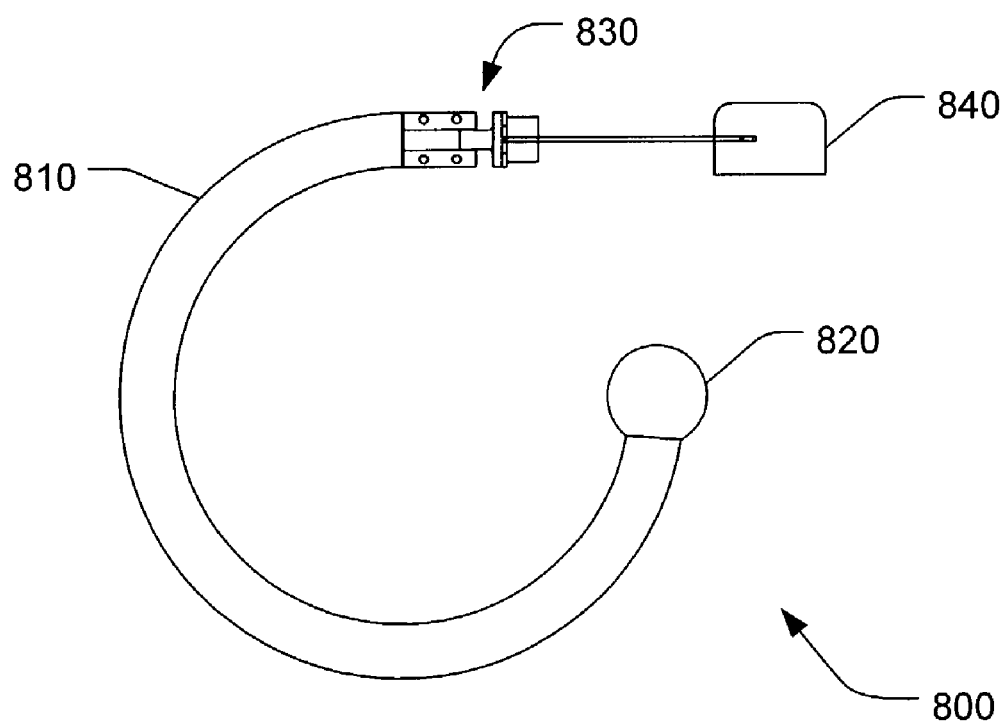
FIG. 8 illustrates a side view of a vehicle accessory in accordance with an aspect of the present invention.

FIG. 8 illustrates a vehicle accessory 800 in accordance with an aspect of the present invention comprising a housing 810 and an end ornament 820. The vehicle accessory 800 includes a mounting assembly 830 for removably coupling the accessory 800 to a vehicle (not shown). For example, the accessory 800 can be coupled to a side view mirror of an automobile. It is to be appreciated that the vehicle accessory 800 can also be permanently coupled to the vehicle via an adhesive or other mechanism. The accessory 800 can be wired into a turn signal mechanism in the automobile, such that a light source (not shown) in the accessory 800 can also signal a turn. If an electroluminescent wire is employed as the light source for the accessory 800, a transformer 840 is included to convert DC current to AC current. The transformer is made of steel laminations wrapped with a predetermined number of coils of wire. The number of coils is selected based on a desired voltage change ratio. Alternatively, the light source can include a wireless chip such that when lights are activated in the vehicle, a signal is sent to the light source to illuminate the vehicle accessory.

Figure 9:
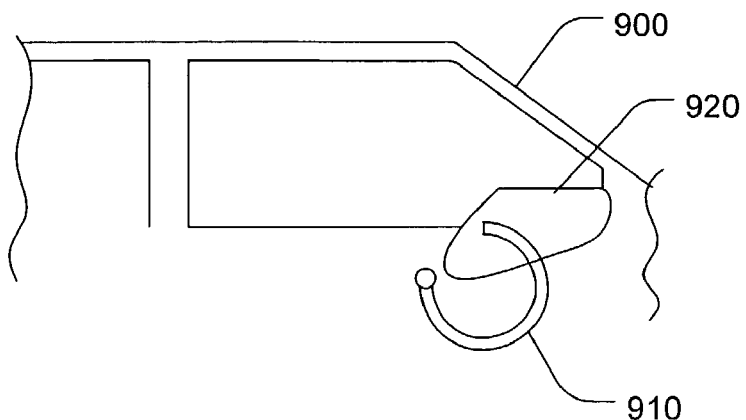
FIG. 9 illustrates a vehicle accessory mounted to a side view mirror of a vehicle in accordance with an aspect of the present invention.

FIG. 9 depicts an automobile 900 having a vehicle accessory 910 mounted on a side view mirror 920 of the automobile 900. The vehicle accessory 910 can be mounted to the mirror 920 such that it is visible to persons on the road who are approaching the vehicle 900 from the forward or rearward direction or persons located adjacent the vehicle 900. The vehicle accessory 910 includes at least one signal light (not shown) which comprises a light source and a light conducting member. In this example, the vehicle is an automobile; however, the accessory 910 can be removably coupled to any other suitable vehicle.

The vehicle accessory 910 can be electrically wired into turn signals of the automobile 900 such that the accessory 910 is operable to signal a turn. Accordingly, the turn signals are more noticeable than conventional tail lights as the accessory 910 is near eye-level of adjacent drivers. Further, employing the vehicle accessory 910 as turn signals will allow drivers in a blind spot of the automobile 900 to see the turn signal. Thus, unlike other accessories which generally soften an accident, accessory 910 can help prevent an accident. Accordingly, the vehicle accessory 910 can provide advanced notification to approaching vehicles that the driver of automobile 900 intends to turn or make a lane change.

Figure 10:
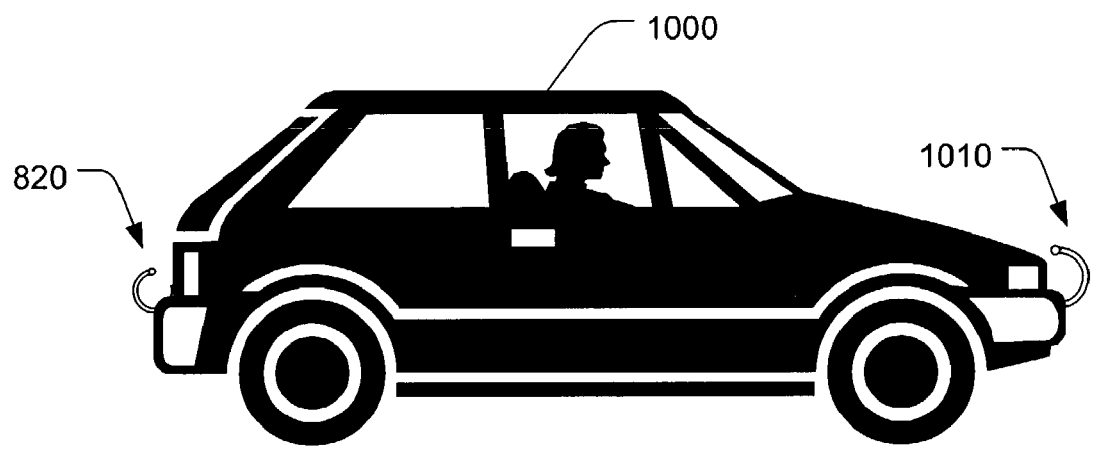
FIG. 10 illustrates vehicle accessories mounted to a front and back portion of a vehicle in accordance with an aspect of the present invention.

It is to be appreciated that a vehicle accessory can be located on any part of a vehicle and is contemplated as falling within the scope of the invention. For example, turning to FIG. 10, an automobile 1000 is depicted with vehicle accessories 1010 and 1020 located at different areas on the automobile 1000, such as a front portion and a rear portion of the automobile 1000. Vehicle accessories can additionally, or alternatively, be coupled to at least one interior portion of a vehicle. The accessories 1010 and 1020 can be functional and illuminate with various functions of the automobile 1000, such as signaling a turn, applying brakes, signaling an emergency situation, turning on parking and/or driving lights, etc.

Figure 11:
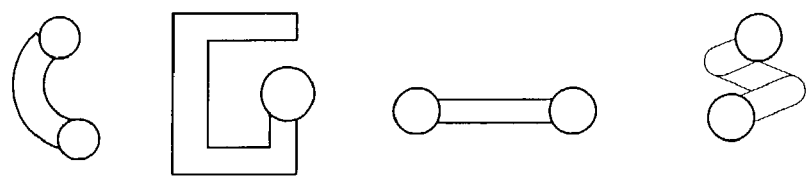
FIG. 11 illustrates examples of various vehicle accessory shapes in accordance with an aspect of the present invention.

Furthermore, it is to be appreciated that the vehicle accessory configurations, placement positions on vehicles, illuminating examples, etc. have been presented herein for sake of illustration and description only. As such, these systems and methods are not intended to be exhaustive or to limit the invention to the systems and methods disclosed. For example, FIG. 11 illustrates some alternate housing shapes that can be employed.

Figure 12:
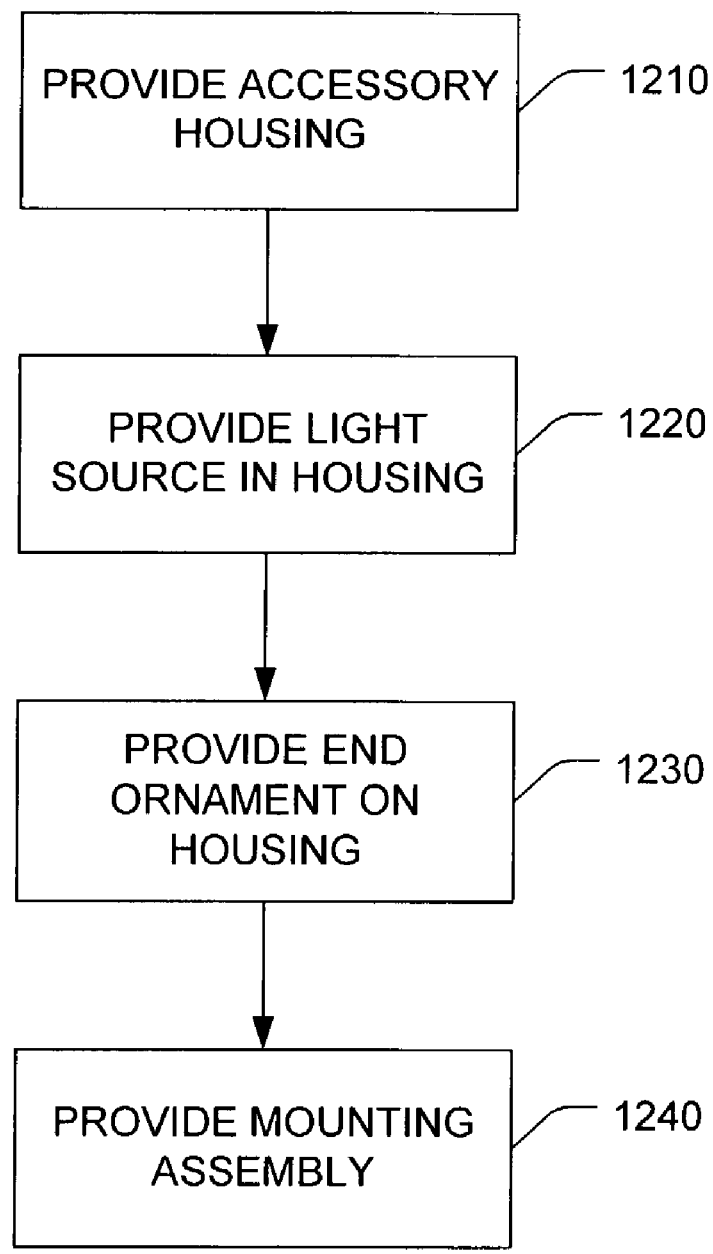
FIG. 12 illustrates a methodology for fabricating a vehicle accessory in accordance with an aspect of the present invention.
Figure 13:
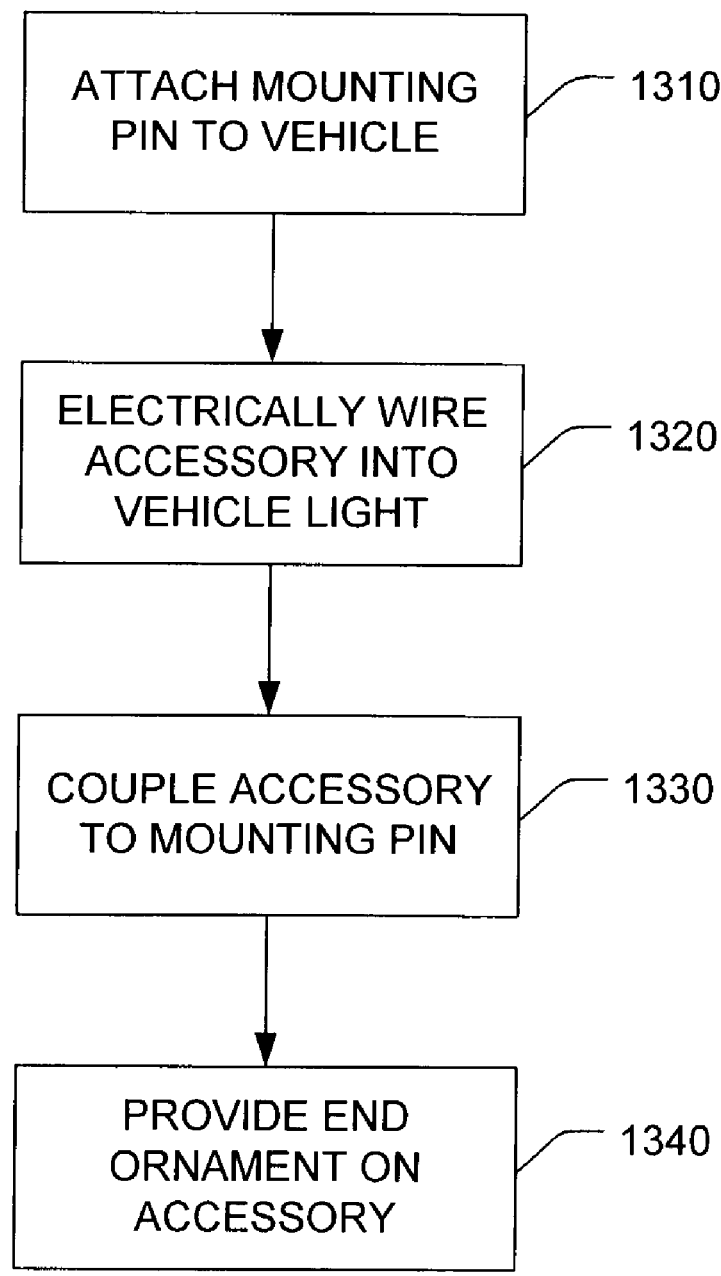
FIG. 13 illustrates a methodology for coupling a vehicle accessory to a vehicle in accordance with an aspect of the present invention.
Figure 14:
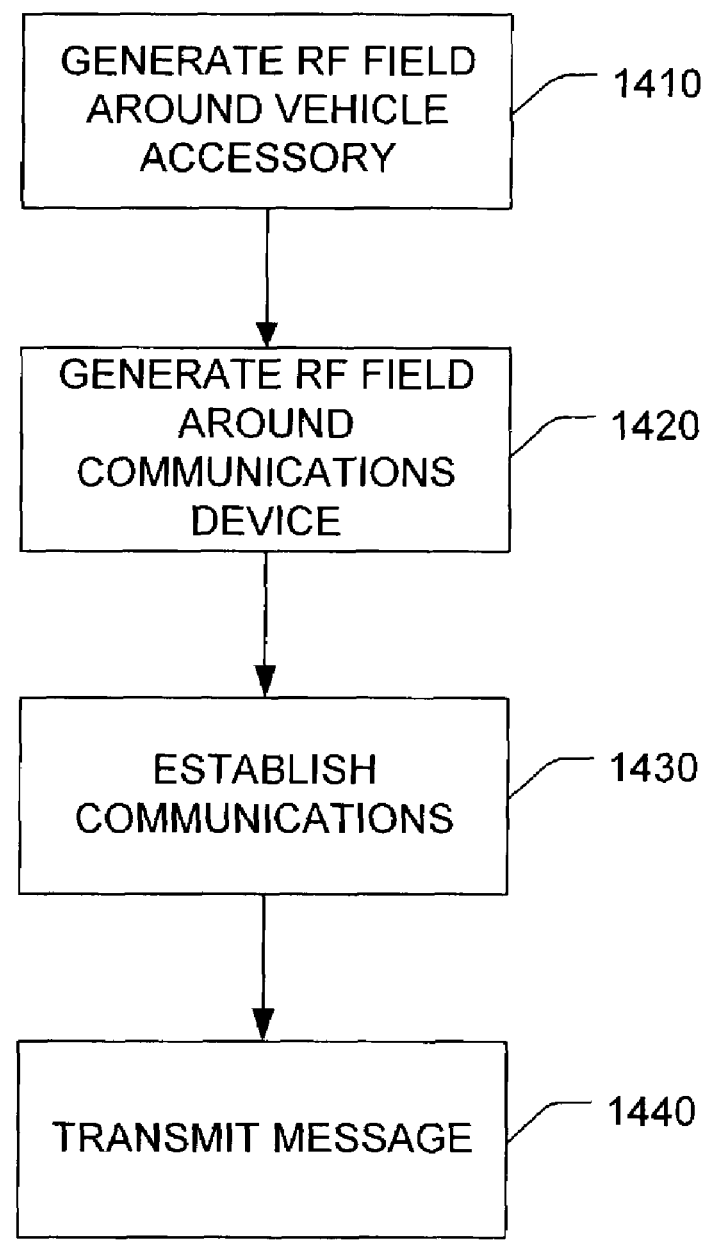
FIG. 14 illustrates a methodology for employing the vehicle accessory as a communication hub in accordance with an aspect of the present invention.

In view of the foregoing structural and functional features described above, methodologies in accordance with various aspects of the present invention will be better appreciated with reference to FIGS. 12–14. While, for purposes of simplicity of explanation, the methodologies of FIGS. 12–14 are illustrated and described as executing serially, it is to be understood and appreciated that the present invention is not limited by the illustrated order, as some aspects could, in accordance with the present invention, occur in different orders and/or concurrently with other aspects from that depicted and described herein. Moreover, not all illustrated features may be required to implement a methodology in accordance with an aspect the present invention.

In FIG. 12, a methodology for fabricating a vehicle accessory is illustrated. The methodology begins at 1210 where a housing having a mounting portion is provided. The mounting portion is operable to couple the housing to a vehicle. At 1220, a light source is provided in a housing of the vehicle accessory. The light source can be wired into a vehicle such that it is operative to illuminate substantially simultaneously with vehicle lights. An end ornament is provided on the housing at 1230. The end ornament can be of any shape and size. The end ornament can illuminate with the accessory; or alternatively can include a separate light source. Then, at 1240, a mounting assembly is provided for coupling the vehicle accessory to the vehicle. The mounting assembly can comprise a pin and collar assembly or any other suitable mounting mechanism.

Turning now to FIG. 13, a methodology is illustrated for employing a vehicle accessory. The methodology begins at 1310 where a mounting pin is removably coupled to a vehicle. A nut and bolt assembly or any other suitable mounting mechanism can be employed to couple the mounting pin to the vehicle. At 1320, a light source in the vehicle accessory is electrically wired into at least one light of the vehicle. Accordingly, the accessory is able to illuminate when a corresponding light of the vehicle illuminates. At 1330, the vehicle accessory is coupled to the mounting pin such that the vehicle accessory is suitably mounted to the vehicle. A collar can be employed to couple the vehicle accessory to the mounting pin. An end ornament is provided on the vehicle accessory at 1340.

Turning now to FIG. 14, a methodology for providing wireless communication via a vehicle accessory in accordance with the present invention is provided. Beginning at 1410, an RF field is generated around at least one vehicle accessory. At 1420, an RF field is generated around a wireless communications device (e.g., cellular telephone, personal digital assistant, such as a Palm Pilot, adapted for wireless communication, and a mobile messaging device, such as a BLACKBERRY™ device). At 1430, communications are established between the wireless communications device and at least one vehicle accessory. At 1440, a message, greeting, expression, identification, information, communication, inscription, design, artwork, digital image, or the like is wirelessly transmitted between the wireless communications device and the at least one vehicle accessory.

It is to be appreciated that the vehicle accessories of the subject invention as described herein can be employed with automobiles, trucks, motorcycles, scooters, bicycles, or any other suitable vehicle. What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A vehicle accessory comprising;
   a housing configured to be removably coupled to a vehicle;
   a light conducting member extending through the housing for illuminating at least a portion of the housing;
   electrical wiring which extends from the light conducting member to a light in the vehicle, such that the light conducting member illuminates with the corresponding vehicle light; and
   an end ornament comprising a communications interface for at least one of receiving and transmitting information, the communications interface comprising at least a display that shows at least a text message.

2. The vehicle accessory of claim 1, the light conducting member comprises a light pipe and a light source.

3. The vehicle accessory of claim 2, the light source is a light emitting diode (LED).

4. The vehicle accessory of claim 2, the light source is an electroluminescent wire.

5. The vehicle accessory of claim 4, further comprising a transformer for converting DC current to AC current.

6. The vehicle accessory of claim 1, the light conducting member comprises a fiber optic bundle.

7. The vehicle accessory of claim 1, further comprising a pin and collar mounting assembly.

8. The vehicle accessory of claim 1, the housing is illuminated at least one of red, yellow, blue, purple, green, orange, black, white, pink, amber.

9. The vehicle accessory of claim 1, the housing is illuminated by at least one of a constant light intensity and a variable light pattern intensity.

10. The vehicle accessory of claim 1, the housing is at least one of ring-shaped, crescent-shaped, straight-shaped, and spiral-shaped.

11. The vehicle accessory of claim 1, the end ornament comprises a ball having a recess that corresponds with an outer diameter of the vehicle accessory.

12. The vehicle accessory of claim 1 being mounted on a side view mirror of an automobile and electrically wired into a turn signal light of the automobile.

13. The vehicle accessory of claim 1 being mounted on a front portion of an automobile and electrically wired into at least one of a turn signal light, a brake light, a hazard light, a parking light, and a security system.

14. The vehicle accessory of claim 1 being mounted on a rear portion of an automobile and electrically wired into at least one of a turn signal light, a brake light, a hazard light, a parking light, and a security system.

15. The vehicle accessory of claim 1, further comprising a speaker for transmitting audible signals to an operator of the vehicle.

* * * * *